United States Patent [19]
Bouvier

[11] Patent Number: 5,801,575
[45] Date of Patent: Sep. 1, 1998

[54] PROCESS AND DEVICE CONTROLLING THE OPERATION OF A PORTABLE ELECTRONIC OBJECT SUPPLIED VIA ITS ANTENNA

[75] Inventor: Jacky Bouvier, Meylan, France

[73] Assignee: France Telecom, France

[21] Appl. No.: 696,959

[22] PCT Filed: Jan. 4, 1996

[86] PCT No.: PCT/FR96/00012

§ 371 Date: Aug. 16, 1996

§ 102(e) Date: Aug. 16, 1996

[87] PCT Pub. No.: WO96/21906

PCT Pub. Date: Jul. 18, 1996

[30] Foreign Application Priority Data

Jan. 11, 1995 [FR] France .................. 95 00272

[51] Int. Cl.$^6$ .................................................. G05F 1/10
[52] U.S. Cl. ...................... 327/530; 327/538; 327/540
[58] Field of Search ........................ 327/530, 538, 327/540, 541, 543, 547, 544–546, 531, 535, 534, 72, 74, 65

[56] References Cited

U.S. PATENT DOCUMENTS 4,594,517  6/1986  Cohen et al. ........................ 327/531
5,276,646  1/1994  Kim et al. ........................... 327/530
5,498,995  3/1996  Szepesi et al. ..................... 327/540

FOREIGN PATENT DOCUMENTS

A-400764  4/1986  European Pat. Off. .
A-453314  4/1991  European Pat. Off. .
A-583690  8/1993  European Pat. Off. .

*Primary Examiner*—Timothy P. Callahan
*Assistant Examiner*—Eunja Shin

[57] ABSTRACT

The device comprises, connected to the antenna, a rectifier (RD) delivering a primary DC supply voltage (VNR) at its output terminal (BS), stabilizing means (1,ST) for generating a stabilized DC voltage (VDD) from the said primary voltage. First means (R3, R4, R5) calculate a first prespecified voltage threshold corresponding to a prespecified level of the stabilized DC supply voltage. Comparison means (CP) are also provided, the output terminal (BS2) of which is connected to the processing means, a first input of which is connected to the output of the first calculating means, and a second input of which is connected to the output terminal (BS) of the rectifier. Furthermore, a load (RBL) with chosen impedance is connected between the said output terminal of the rectifier and earth by way of a controllable switching means (T200) whose control input is joined to the output terminal of the comparison means (CP).

16 Claims, 1 Drawing Sheet

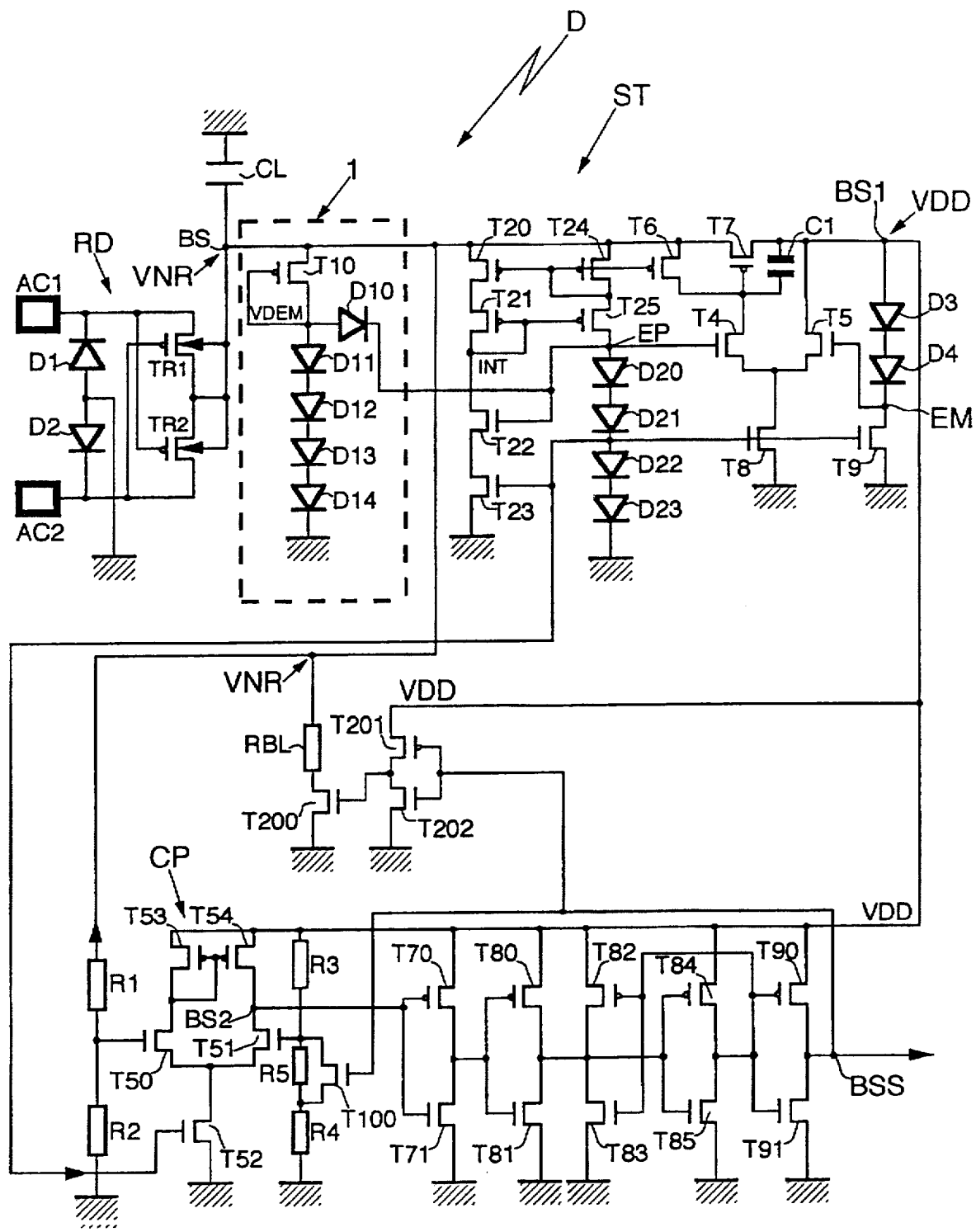

PROCESS AND DEVICE CONTROLLING THE OPERATION OF A PORTABLE ELECTRONIC OBJECT SUPPLIED VIA ITS ANTENNA

TECHNICAL FIELD

The invention relates to the control of the operation of the electronic means of a portable object equipped with an antenna enabling these electronic means to be supplied electrically.

BACKGROUND

The invention applies advantageously but non-limitingly to the supervision of access to a building, for example. During such supervision, the bearer of the portable object, such as a card, presents the latter in proximity to a terminal cooperating electromagnetically with the antenna of the card. The electromagnetic energy received by the antenna of the card makes it possible to energize the chip installed in its surface. When the supply voltage delivered is sufficient, the processing means of the card are activated allow [sic] management of the protocol for exchanging data between the terminal and the card.

However, during the activation of the electronic processing means, the latter suddenly absorb part of the energy available, bringing about an abrupt drop in the supply voltage available. This may result in a shutdown of the operation of these electronic means if the voltage available drops below a floor threshold. After the shut down of the operation of the electronic means, the voltage rises again to allow reactivation of the electronic means, so leading to a repetition of the phenomenon just described.

These successive fits and starts are prejudicial to the proper operation of the electronics of the card.

SUMMARY

The invention aims to afford a solution to this problem.

Its object is to allow crisp starting of the electronic processing means of the portable object, avoiding successive shutdowns and restarts following a sudden power demand.

The invention therefore proposes a device for controlling the operation of the electronic processing means of a portable object equipped with an antenna, which comprises, connected to the antenna, a rectifier delivering a primary DC supply voltage at its output terminal, and stabilizing means for generating a stabilized DC voltage from the said primary voltage. First means calculate a first prespecified voltage threshold corresponding to a prespecified level of the stabilized DC supply voltage. The device also comprises comparison means, the output terminal of which is connected to the processing means, a first input of which is connected to the output of the first calculating means, and a second input of which is connected to the output terminal of the rectifier. The comparison means are intended overall to compare the primary voltage with the first threshold. A load with chosen impedance with is also provided, connected between the said output terminal of the rectifier and earth by way of a controllable switching means whose control input is joined to the output terminal of the comparison means.

The prespecified level of the (virtually constant) stabilized voltage corresponds to a sufficient level of supply to the electronic means arranged down-stream of the device allowing them to operate correctly. Moreover, by reason especially of the absorption of energy inherent to the stabilizing means, the value of the stabilized voltage is below that of the primary voltage. Additionally, the first voltage threshold (for example 5.5 volts) is above this level of the stabilized voltage (for example 4.2 volts).

As far as the impedance of the said load is concerned, it is chosen as a function of the electrical characteristics of the electronic processing means arranged downstream of the device according to the invention. More precisely, the impedance of this load is chosen as a function of the quantity of energy absorbed by the electronic processing means during their activation (power demand).

In other words, a load with chosen impedance is used, during the rise in the supply voltage and when the electronic processing means are not as yet activated, to simulate, as regards the energy absorbed, these electronic processing means. Thus, when the supply voltage reaches the said first voltage threshold, the load is disconnected and the electronic processing means are activated, which then produces virtually no voltage drop or power demand, since this load was chosen so as to be equivalent, as regards current consumption or energy absorption, to the electronic processing means.

The value of this impedance may be readily obtained via a measurement of current for example.

The subject of the invention is also a process for controlling the operation of the electronic means of a portable object equipped with an antenna, in which a primary DC voltage is generated from the energy received by the antenna, and a stabilized voltage is generated from the said primary voltage. The said primary voltage is then compared with a first prespecified voltage threshold corresponding to a prespecified stabilized voltage level. A load with chosen impedance is connected between the primary voltage and earth so long as the said primary voltage remains below the said first voltage threshold, the electronic processing means then being inactive. When the primary voltage reaches the said voltage threshold, the said load is disconnected, the electronic processing means are activated and are supplied with the said stabilized voltage.

In fact, according to one implementation, the said primary voltage is compared with the said first prespecified voltage threshold by comparing an auxiliary primary voltage equal to a prespecified fraction of the said primary voltage with a first auxiliary stabilized voltage equal to a first prespecified fraction of the said stabilized voltage.

Thus, according to one embodiment of the device according to the invention, this device comprises an auxiliary divider bridge connected between the output terminal of the rectifier and earth and whose mid-point is joined to the second input of the comparison means. The first calculating means then comprise a first divider bridge connected between the output of the stabilizing means and earth and whose mid-point is joined to the first input of the comparison means.

Although the invention may be implemented by using a single voltage threshold, it has been deemed preferable to provide a hysteresis in the threshold comparison. In other words, the electronic processing means being activated, the primary voltage is compared with a second prespecified voltage threshold below the first voltage threshold, and also corresponding to the said prespecified voltage level for the stabilized voltage, and when the primary voltage reaches this second voltage threshold, the electronic processing means are deactivated whilst reconnecting the said load.

The said second voltage threshold for the primary voltage (for example 4.6 volts), below the first voltage threshold (5.5 volts), thus makes it possible advantageously to detect a drop in the primary voltage and to deactivate the electronic means whilst they are still operating correctly.

According to one implementation, the said primary voltage is compared with the said second prespecified voltage threshold by comparing the said auxiliary primary voltage equal to the said prespecified fraction of the said primary voltage with a second auxiliary stabilized voltage equal to a prespecified fraction of the said stabilized voltage.

In order to produce such a hysteresis, the device furthermore advantageously comprises second means for calculating a second prespecified voltage threshold also corresponding to the prespecified level of the stabilized DC supply voltage, and controllable selection means, the control input of which is joined to the output terminal of the comparison means, in order to join, to the first input of the comparison means, the output of the first calculating means or the output of the second calculating means.

More particularly, it comprises a first resistor connected between the output of the stabilizing means and the first input of the comparison means, as well as second and third resistors connected in series between the first input of the comparison means and earth. The first divider bridge is then formed by the three resistors whereas the second calculating means include a second divider bridge formed by the first and third resistors. The selection means then include an auxiliary controllable switching means connected in parallel to the terminals of the second resistor in order to short-circuit or not the latter and as a consequence to join the mid-point of the second divider bridge or the mid-point of the first divider bridge to the first input of the comparison means.

The controllable switching means may include a transistor whose gate is joined to the output of the comparison means via an invertor.

Moreover, so as in particular to facilitate the starting of the stabilizing means, the latter preferably include means for generating a prespecified reference voltage, (for example 2.8 volts), the input of which is joined to the output terminal of the rectifier, as well as a differential amplifier one of the inputs of which is joined to the output of the generating means and the output of which, delivering the said stabilized voltage, is looped-back to the other input of the amplifier.

The invention also proposes a portable object, including an antenna, electronic processing means supplied from the energy received by the antenna, and a device for controlling the operation of the electronic processing means, such as defined earlier, and connected between the antenna and the electronic processing means.

DRAWINGS

Other advantages and characteristics of the invention will emerge on examining the detailed description of an entirely non-limiting embodiment of the invention, illustrated in the single figure representing a schematic overview of such an embodiment.

DETAILED DESCRIPTION

As illustrated in this figure, the device D according to the invention includes, at the front end, a rectifier RD whose two input terminals are connected respectively to the two terminals AC1 and AC2 of an electromagnetic coil forming the antenna of the portable object in which this device is installed.

This rectifier includes two diodes D1 and D2 whose anodes are earthed and whose cathodes are joined respectively to two field-effect transistors TR1 and TR2 whose respective sources and substrates, forming the output terminal BS of this rectifier, are earthed by way of a smoothing capacitor CL.

Voltage stabilizing means, bearing the general reference ST, are connected to this output terminal BS.

These stabilizing means ST include, at the front end, means 1 for generating a reference voltage VDEM from the primary DC supply voltage VNR available at the output terminal BS.

More precisely, these means 1 include a series of four identical diodes D11 to D14 connected between the terminal BS and earth by way of a field-effect transistor T10 whose gate is looped-back to its drain.

This reference voltage VDEM, available at the anode of the first diode D11, is then injected by way of a diode D10 at the positive input EP of a differential amplifier around which the second part of the stabilizing means hinges.

This differential amplifier is here formed around a differential pair of field-effect transistors T4 and T5 whose respective sources are earthed via a field-effect transistor T8 forming a current source.

The negative input of this differential amplifier is situated level with the gate EM of the transistor T5.

The output BS1, consisting of the drain of the transistor T5, of this amplifier is looped-back to the negative input EM by way of two diodes D3 and D4, through which a constant current is maintained with the aid of the transistor T9, forming a current source, and connected between the cathode of the diode D4 and earth.

A series of four diodes D20 to D23, identical to the diodes D3 and D4 and also producing a reference voltage, are connected between the positive input EP of the differential amplifier and earth.

The terminals BS and BS1 are joined together by way of a transistor T7 functioning as a variable resistor or ballast.

The transistor T6, connected between the drain of the transistor T4 and the terminal BS, constitutes a load for this transistor, whereas the capacitor C1 connected between the drain of the transistor T4 and the terminal TS1 provides stabilization for this fed-back amplifier.

A bias voltage is present at the cathode of the diode D21, making it possible to bias the transistors T8 and T9 on the one hand, and the transistor T23 on the other hand, which, together with the transistors T22, T21, T20, T24 and T25, form part of a current mirror making it possible to stabilize the voltage at the input EP.

Three resistors R3, R5 and R4 are connected in series between the output terminal BS1 of the stabilizing means and earth.

The common terminal of the first resistor R3 (for example 450 kΩ) and of the second resistor R5 (for example 248 kΩ) is joined to the gate of a transistor T51 forming, together with a counterpart transistor T50, the core of a comparator CP. The transistors T53 and T54, connected respectively to the drain of the transistors T50 and T51, form a load for these latter, which is energized via the stabilized voltage VDD available at the terminal BS1. Furthermore, the transistor T52, joined between the sources of the transistors T50 and T51 and earthed, is biased in a similar manner to the transistors T23, T8 and T9, and forms a current source. Whereas the first input of this comparator is situated level with the gate of the transistor T51, its second input is situated level with the gate of the transistor T50, and its output BS2 level with the drain of the transistor T51.

The device also includes a load with chosen impedance, here a resistor RBL, connected between the output terminal BS of the rectifier and earth by way of a field-effect transistor T200. This transistor is controlled on its gate by the signal available at the output terminal BSS via an invertor formed by two complementary field-effect transistors T201 and T202 supplied with the voltage VDD.

Two resistors R1 (for example 446 kΩ) and R2 (for example 400 kΩ), forming an auxiliary divider bridge whose mid-point is joined to the second input of the comparator CP, are connected in series between the output terminal BS of the rectifier and earth.

As will be seen in greater detail below, the output BS2 of the comparator CP delivers a logic signal for activating the electronic processing means joined to the output terminal BS of the device and energized by the virtually constant stabilized DC voltage VDD whose nominal value is for example 4.2 volts.

In fact, this logic signal delivered by the comparator is shaped in an appropriate circuit before being delivered to the output terminal BSS.

More precisely, this shaping circuit firstly includes a pair of complementary transistors T70, T71 forming an amplifier, followed by a trigger circuit formed by the transistors T80 to T85, and lastly by a final inverting amplifier formed by the two complementary transistors T90 and T91.

Furthermore, a field-effect transistor T100 whose gate (control input) is joined to the output of the comparator CP by way of the shaping circuit, is connected to the terminals of the second resistor R5.

As will be seen in greater detail below, this transistor T100 forms means for selecting one or other of the two divider bridges formed from the three resistors R3 to R5 connected in series. Thus, if the transistor T100 is off, that is to say if the resistor R5 is not short-circuited, the first resistor R3 on the one hand and the other two resistors R5 and R4 (for example 483 kΩ) on the other hand form a first divider bridge delivering a first fraction of the stabilized voltage VDD to the first input of the comparator CP.

If by contrast the transistor T100 is on, short-circuiting the resistor R5, the resistor R3 on the one hand and the resistor R4 on the other hand then form a second divider bridge delivering a second fraction of the voltage VDD to the first input of the comparator.

The device also includes a load with chosen impedance, here a resistor RBL, connected between the output terminal BS of the rectifier and earth by way of a field-effect transistor T200. This transistor is controlled on its gate by the signal available at the output terminal BSS via an invertor formed by two complementary field-effect transistors T201 and T202 supplied with the voltage VDD.

The operation of the device according to the invention will now be described in detail.

The AC voltage received as input to the rectifier and arising from the radiofrequency energy received at the inductive antenna, generates a non-stabilized DC primary voltage VNR at the output terminal BS.

On startup, the voltage VDEM is coarsely stabilized with four diode thresholds, i.e. around 2.8 V, by way of the four diodes D11 to D14 energized by way of the transistor T10. This voltage VDEM is injected, by way of the diode D10, into the input EP of the stabilizing means and thus makes it possible to initiate the loop-back operation of the amplifier T4, T5 delivering the stabilized DC voltage VDD at its output.

In the absence of the means 1, the voltage at the point EP could, in certain cases, possibly remain at the zero value and this would make it impossible to obtain the desired voltage VDD at the output.

In the present case, the nominal voltage VDD delivered is equal to the six identical thresholds of the diodes D20 to D23, D3 and D4, i.e. around 4.2. V, which, in this example embodiment, turns out to be sufficient to energize the electronic processing means connected to the output terminal BSS.

At the commencement of the electromagnetic cooperation between the portable object and the energy source, for example a terminal in an access supervision application, and so long as the stabilized supply voltage has not reached a first voltage threshold (here 5.5 volts) allowing activation of the electronic means of this portable object, the enabling logic signal delivered at the output BSS is in the zero logic state so that the transistor T100 is off.

The comparator CP then compares the fraction of the primary voltage VNR, obtained by the divider bridge R1, R2, with the first fraction of the stabilized voltage VDD obtained from the first divider bridge formed by the resistor R3 on the one hand and the resistors (R5, R4) on the other hand.

The enabling logic signal then passes to the 1 logic state when these two fractions are equal.

Given the various values of the resistors employed here, the logic signal passes to the 1 state when the voltage VNR reaches the first voltage threshold equal to 5.5 volts, corresponding to the nominal level for the voltage VDD equal to 4.2 volts.

So long as the voltage VNR has not reached the first voltage threshold, the transistor T200 receives a control signal having the logic value 1 (by reason of the invertor T201 and T202) on its gate, thus switching it on.

Also, the resistor RBL is electrically connected between the voltage VNR and earth.

When the enabling logic signal passes to the 1 logic state, allowing activation of the electronic means, the transistor T200 switches off, electrically disconnecting the resistor RBL.

Since this resistor RBL is chosen in such a way as to be electrically equivalent to the electronic processing means of the portable object (as regards energy absorption and consumption of current) there is therefore virtually no voltage drop upon activation of the electronic processing means. In other words, this activation is virtually "transparent" vis-a-vis the supply voltage VNR.

A simple way of adjusting the value of this resistor consists in carrying out a measurement of current in the device, with a known voltage VNR.

More precisely, the current in the device can be measured just before and just after activation of the electronic processing means. The ratio of the value of the first voltage threshold to the corresponding variation in current allows simple determination of a resistance value by applying Ohm's law.

It may then be readily verified that this value is correctly chosen by carrying out a new measurement of current, for example the current flowing in the resistor, under the same conditions. If the resistance value is chosen suitably, the variation in current in this resistor is virtually zero.

During a shutdown of the protocol for dialogue between the portable object and the energy source, the supply voltage VNR drops. Also, in order to allow crisp shutdown of the electronic processing means, when the latter are still sufficiently energized, the fraction of the supply voltage VNR, obtained from the auxiliary divider bridge (R1, R2), is compared, at the level of the comparator CP, with the second fraction of the voltage VDD, obtained from the divider bridge R3 and R4 (since the resistor R5 is short-circuited).

Given the resistance values used here, the enabling logic signal reverts to the zero logic state when the voltage VNR reaches the low voltage threshold equal to 4.6 volts, this also corresponding to the nominal level of the stabilized voltage.

The enabling logic signal, by reverting to the zero state, then again switches off the transistor T100 and switches on the transistor T200 so as subsequently to allow a possible new smooth startup of the electronic processing means of the portable object.

I claim:

1. Process for controlling the operation of an electronic circuit of a portable object equipped with an antenna, wherein a primary DC voltage is generated from energy received by the antenna, a stabilized voltage is generated from said primary DC voltage, said primary DC voltage is compared with a first prespecified voltage threshold derived from said stabilized voltage, a load with a prespecified impedance is connected between the primary DC voltage and earth so long as the primary DC voltage remains below said first prespecified voltage threshold, the electronic circuit then being inactive, and when the primary DC voltage reaches said first prespecified voltage threshold, said load is disconnected from said primary DC voltage and the electronic circuit is supplied with said stabilized voltage and is thereby activated.

2. Process according to claim 1, wherein after the electronic circuit has been activated, the primary DC voltage is compared with a second prespecified voltage threshold, said second prespecified voltage threshold also being derived from said stabilized voltage but being below the first prespecified voltage threshold, and when the primary DC voltage drops below said second prespecified voltage threshold, the electronic circuit is deactivated and said load is reconnected to the primary DC voltage.

3. Process according to claim 2, wherein said primary DC voltage is compared with said first prespecified voltage threshold by comparing an auxiliary primary voltage equal to a first prespecified fraction of said primary DC voltage with a first auxiliary stabilized voltage equal to a second prespecified fraction of said stabilized voltage.

4. Process according to claim 3, wherein said primary DC voltage is compared with said second prespecified voltage threshold by comparing said auxiliary primary voltage with a second auxiliary stabilized voltage equal to a third prespecified fraction of said stabilized voltage.

5. Device for supplying power to an electronic circuit of a portable object equipped with an antenna, said device comprising:

a rectifier connected to the antenna, for delivering a primary DC supply voltage at an output terminal of the rectifier, stabilizing means for generating a stabilized DC supply voltage from said primary DC supply voltage, first calculating means for calculating a first prespecified voltage threshold from the stabilized DC supply voltage, comparison means having an output terminal connected to the electronic circuit, a first input terminal connected to an output of the first calculating means, and a second input terminal connected to the output terminal of the rectifier, for determining when the primary DC supply voltage has reached said first prespecified voltage threshold, a load with a fixed impedance, and a controllable switching means having a control input connected to the output terminal of the comparison means for switchably connecting said fixed impedance load between the output terminal of the rectifier and earth when the primary DC supply voltage from the rectifier is below said first prespecified voltage threshold.

6. Device according to claim 5, further comprising second calculating means for calculating a second prespecified voltage threshold from said stabilized DC supply voltage, and controllable selection means, a control input of which is connected to the output terminal of the comparison means, for selectively coupling to the first input terminal of the comparison means either the output of the first calculating means or an output of the second calculating means.

7. Device according to claim 6, further comprising an auxiliary divider bridge connected between the output terminal of the rectifier and earth and having a mid-point connected to the second input terminal of the comparison means wherein the first calculating means comprises a first divider bridge connected between the output of the stabilizing means and earth and having a mid-point connected to the first input terminal of the comparison means.

8. Device according to claim 7, wherein the first divider bridge comprises a first resistor connected between the output of the stabilizing means and the first input terminal of the comparison means, and a second resistor and a third resistor connected in series between the first input terminal of the comparison means and earth, wherein the second calculating means includes a second divider bridge formed by only the first and third resistors, and the controllable selection means includes an auxiliary controllable switching means connected in parallel to the terminals of the second resistor in order to selectively short-circuit the second resister and thereby to selectively connect either the mid-point of the second divider bridge or the mid-point of the first divider bridge to the first input terminal of the comparison means.

9. Device according to claim 6, wherein the controllable switching means includes a transistor whose gate is coupled to the output terminal of the comparison means via an invertor.

10. Device according to claim 5, wherein the stabilizing means includes generating means for generating a prespecified reference voltage and having an input connected to the output terminal of the rectifier, and a differential amplifier for delivering said stabilized DC supply voltage and having a first input connected to said prespecified reference voltage and a second input connected to said stabilized DC supply voltage.

11. A portable card device comprising:

an electronic data processor circuit for managing a data exchange protocol, an antenna adapted to be coupled electromagnetically to an external terminal to thereby receive power and data from said external terminal and to transmit data to said external terminal, a rectifier connected to the antenna, for delivering a primary DC supply voltage at an output terminal of the rectifier, stabilizing means for generating a stabilized DC supply voltage from said primary DC supply voltage, first calculating means for calculating a first prespecified voltage threshold from the stabilized DC supply voltage, comparison means having an output terminal connected to the electronic data processor circuit, a first input terminal connected to an output of the first calculating means, and a second input terminal connected to the output terminal of the rectifier, for determining when the primary DC supply voltage has reached said first prespecified voltage threshold, a load with a fixed impedance, and a controllable switching means having a control input connected to the output terminal of the comparison means for switchably connecting said fixed impedance load between the output terminal of the rectifier and earth when the primary DC supply voltage from the rectifier is below said first prespecified voltage threshold.

12. Device according to claim 11, further comprising second calculating means for calculating a second prespecified voltage threshold from said stabilized DC supply voltage, and controllable selection means, a control input of which is connected to the output terminal of the comparison means, for selectively coupling to the first input terminal of the comparison means either the output of the first calculating means or an output of the second calculating means.

13. Device according to claim 12, further comprising an auxiliary divider bridge connected between the output terminal of the rectifier and earth and having a mid-point connected to the second input terminal of the comparison means, wherein the first calculating means comprises a first divider bridge connected between the output of the stabilizing means and earth and having a mid-point connected to the first input terminal of the comparison means.

14. Device according to claim 13, wherein the first divider bridge comprises a first resistor connected between the output of the stabilizing means and the first input terminal of the comparison means, and a second resistor and a third resistor connected in series between the first input terminal of the comparison means and earth, wherein the second calculating means includes a second divider bridge formed by only the first and third resistors, and the controllable selection means includes an auxiliary controllable switching means connected in parallel to the second resistor in order to selectively short-circuit the second resistor and thereby to selectively connect either the mid-point of the second divider bridge or the mid-point of the first divider bridge to the first input terminal of the comparison means.

15. Device according to claim 12, wherein the controllable switching means includes a transistor whose gate is coupled to the output terminal of the comparison means via an invertor.

16. Device according to claim 11, wherein the stabilizing means includes generating means for generating a prespecified reference voltage and having an input connected to the output terminal of the rectifier, and a differential amplifier for delivering said stabilized DC supply voltage and having a first input connected to said prespecified reference voltage and a second input connected to said stabilized DC supply voltage.

* * * * *